(12) United States Patent
Okamoto et al.

(10) Patent No.: US 9,593,796 B2
(45) Date of Patent: Mar. 14, 2017

(54) HOT-DIP GALVANIZED STEEL PIPE AND METHOD OF MANUFACTURING THE SAME

(71) Applicant: NIPPON STEEL & SUMITOMO METAL CORPORATION, Tokyo (JP)

(72) Inventors: Kouichi Okamoto, Tokyo (JP); Hiroshi Takebayashi, Tokyo (JP); Yoshitaka Soga, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/395,175

(22) PCT Filed: Dec. 13, 2012

(86) PCT No.: PCT/JP2012/082397
§ 371 (c)(1),
(2) Date: Oct. 17, 2014

(87) PCT Pub. No.: WO2013/161122
PCT Pub. Date: Oct. 31, 2013

(65) Prior Publication Data
US 2015/0090359 A1 Apr. 2, 2015

(30) Foreign Application Priority Data
Apr. 24, 2012 (JP) ................. 2012-098298

(51) Int. Cl.
*B05D 1/00* (2006.01)
*C23C 2/00* (2006.01)
(Continued)

(52) U.S. Cl.
CPC .............. *F16L 58/08* (2013.01); *C22C 18/00* (2013.01); *C23C 2/02* (2013.01); *C23C 2/06* (2013.01);
(Continued)

(58) Field of Classification Search
CPC ................ C23C 2/06; C23C 2/02; C23C 2/38
(Continued)

(56) References Cited

U.S. PATENT DOCUMENTS 4,048,381 A * 9/1977 Adaniya .................. C25D 3/22
205/176
4,064,320 A * 12/1977 Adaniya .................. C25D 3/22
205/176
(Continued)

FOREIGN PATENT DOCUMENTS

CN 1264750 8/2000
CN 1476487 2/2004
(Continued)

OTHER PUBLICATIONS

Madison Industries, Inc., Zinc Chloride Solution.*
(Continued)

*Primary Examiner* — Dah-Wei D Yuan
*Assistant Examiner* — Hai Yan Zhang
(74) *Attorney, Agent, or Firm* — Clark & Brody

(57) ABSTRACT

There are provided a hot-dip galvanized steel pipe in which the plating layer thereof is less liable to peel off even if the steel pipe is worked, and a method of manufacturing the hot-dip galvanized steel pipe. The hot-dip galvanized steel pipe includes a steel pipe and the plating layer formed on the surface of the steel pipe. Throughout the entire depth of plating layer, the fn defined by the following formula is at least 99.9:

$fn = Fe + Al + Zn$ where, the symbol of an element in the formula represents the content (mass %) of that element in the plating layer.

2 Claims, 4 Drawing Sheets

(51) Int. Cl.
*F16L 58/08* (2006.01)
*C23C 2/02* (2006.01)
*C23C 2/06* (2006.01)
*C23C 2/38* (2006.01)
*C22C 18/00* (2006.01)
*F16L 9/02* (2006.01)
*C23C 2/28* (2006.01)

(52) U.S. Cl.
CPC .................. *C23C 2/28* (2013.01); *C23C 2/38* (2013.01); *F16L 9/02* (2013.01)

(58) Field of Classification Search
USPC .......................................................... 427/433
See application file for complete search history.

(56) References Cited

U.S. PATENT DOCUMENTS

| | | | | |
|---|---|---|---|---|
| 5,292,377 | A * | 3/1994 | Izeki | C23C 2/30 148/23 |
| 5,437,738 | A | 8/1995 | Gerenrot et al. | |
| 6,093,452 | A * | 7/2000 | Ishii | C23C 2/02 427/319 |
| 6,153,314 | A * | 11/2000 | Gilles | C23C 2/06 106/1.05 |
| 6,277,443 | B1 * | 8/2001 | Stefanick | A61K 39/395 34/105 |
| 6,280,795 | B1 * | 8/2001 | Zervoudis | C23C 2/06 420/514 |
| 6,465,114 | B1 * | 10/2002 | Honda | C23C 2/06 148/264 |
| 6,569,268 | B1 * | 5/2003 | Zervoudis | C22C 18/00 148/242 |
| 2004/0055667 | A1 * | 3/2004 | Takada | C21D 8/0278 148/533 |
| 2008/0072784 | A1 * | 3/2008 | Oohashi | C23C 2/06 106/1.18 |
| 2011/0186189 | A1 * | 8/2011 | Futamura | B32B 15/013 148/622 |

FOREIGN PATENT DOCUMENTS

| | | |
|---|---|---|
| JP | 56-020154 | 2/1981 |
| JP | 05-117835 | 5/1993 |
| JP | 10-140316 | 5/1998 |
| JP | 2001-049414 | 2/2001 |
| JP | 2003-328099 | 11/2003 |
| JP | 2004-217993 | 8/2004 |
| JP | 2006-307316 | 11/2006 |
| JP | 2009-197328 | 9/2009 |
| JP | 2009-221601 | 10/2009 |
| JP | 2009-221604 | 10/2009 |
| JP | 2009-221605 | 10/2009 |
| JP | 2009-280895 | 12/2009 |
| JP | 2009-280896 | 12/2009 |
| JP | 2009280895 | * 12/2009 |
| JP | 2011-026630 | 2/2011 |
| JP | 2011-026632 | 2/2011 |
| JP | 2011-089175 | 5/2011 |
| JP | 2011-153326 | 8/2011 |
| WO | 2010/081905 | 7/2010 |

OTHER PUBLICATIONS

Fujimoto, Takehiko, "New Introduction to Surfactants—Completely revised version", Sanyo Chemical Industries, Ltd., Oct. 1, 1981, pp. 26-30 and 63-69 and its concise explanation in English.

* cited by examiner

HOT-DIP GALVANIZED STEEL PIPE AND METHOD OF MANUFACTURING THE SAME

TECHNICAL FIELD

The present invention relates to a hot-dip galvanized steel pipe and a method of manufacturing the hot-dip galvanized steel pipe.

BACKGROUND ART

The hot-dip galvanization has been used widely as a technique for improving the corrosion resistance of a steel material.

JP2009-221601A, JP2009-221604A, JP2009-197328A, JP2011-26630A, and JP2009-221605A describe methods of manufacturing a hot-dip galvanized material in which, even if a molten zinc bath in which the content of Pb is restrained to at most 0.1 mass % and the content of Cd is restrained to at most 0.01 mass % is used in conformity to the RoHS instructions, poor plating occurs infrequently. In the methods of manufacturing a hot-dip galvanized material described in these Patent Documents, a metal such as Sn, Sb, Bi, or In is added to the molten zinc bath in minute amounts.

JP2006-307316A describes a hot-dip galvanizing bath composition for forming a galvanizing film on the surface of a steel material by means of a dipping process. The hot-dip galvanizing bath composition consists of 0.01 to 0.05 wt % of Ni, 0.001 to 0.01 wt % of Al, and 0.01 to 0.08 wt % of Bi, the balance being Zn and unavoidable impurities, and not containing Pb.

JP2011-26632A describes a hot-dip galvanized steel material in which the composition of the plating layer contains at most 0.010 mass % of Pb and 0.04 to 0.50 mass % of Sb.

JP10-140316A describes a method of manufacturing a hot-dip galvanized steel material in which a steel plate, which is plated by using a hot-dip galvanizing bath containing 0.1 to 0.3 wt % of Al and at most 0.01 wt % in total of Pb, Sn, Cd and Sb as impurities, is subjected to rolling with a rolling weight of 50 to 500 tons per 1 m width of steel plate that is in contact with a roll.

JP2011-89175A describes a hot-dip galvanized steel pipe in which the lead concentration in a hot-dip galvanizing film is at most 0.1 mass %, the cadmium concentration therein is at most 0.01 mass %, and the Vickers hardness of an alloy layer part of the hot-dip galvanizing film is at most 110 Hv.

DISCLOSURE OF THE INVENTION

In recent years, with the wide use of flaring, the improvement of the workability of a hot-dip galvanized steel pipe has been demanded. Flaring is a treatment in which the opening part in the end portion of steel pipe is spread toward the outside to form a ring-shaped flare (collar).

When the hot-dip galvanized steel pipe is subjected to flaring, the plating layer is liable to peel off. As a method of reducing the peeling-off of plating layer, it has been known to use a thinner plating layer. With a thinner plating layer, the strain applied to the plating layer at the time of working decreases. However, if the plating layer is made thin, predetermined corrosion resistance cannot be achieved in some cases.

JP2009-221601A, JP2009-221604A, JP2009-197328A, JP2011-26630A, JP2009-221605A, JP2006-307316A, and JP2011-26632A do not describe the tendency of peeling-off of the plating layer at the time of working.

In the method of manufacturing a hot-dip galvanized steel plate described in JP10-140316A, a large amount of Al is added to the hot-dip galvanizing bath. When a large amount of Al is added to the hot-dip galvanizing bath, poor plating is liable to occur on account of oxides of Al. Therefore, in the case where a large amount of Al is added, the atmosphere must be controlled throughout the entire process to prevent oxides from being formed on the surface of steel material and on the surface of hot-dip galvanizing bath. However, in the process of manufacturing a hot-dip galvanized steel pipe, it is difficult to carry out such control.

The hot-dip galvanized steel pipe described in JP2011-89175A must be subjected to a special treatment to decrease the hardnesses of alloy layer and solidified zinc layer of the hot-dip galvanizing film.

An object of the present invention is to provide a hot-dip galvanized steel pipe in which the plating layer is less liable to peel off even if the steel pipe is worked, and a method of manufacturing the hot-dip galvanized steel pipe.

The hot-dip galvanized steel pipe in accordance with the present invention includes a steel pipe and a plating layer formed on the surface of the steel pipe, wherein throughout the entire depth of plating layer, the fn defined by the following formula is at least 99.9:

$$fn = Fe + Al + Zn$$

where, the symbol of an element in the above formula represents the content in mass % of that element in the plating layer.

The method of manufacturing a hot-dip galvanized steel pipe in accordance with the present invention includes a step of dipping a material pipe in a hot-dip galvanizing bath, wherein the hot-dip galvanizing bath contains 0.002 to 0.01 mass % of Al, the balance being Zn and impurities, and the total content of Pb, Sn, Cd, Sb, Bi, Cu, Ni, and In of the impurities is at most 0.1 mass %.

In the hot-dip galvanized steel pipe, and in the hot-dip galvanized steel pipe manufactured by the method of manufacturing the hot-dip galvanized steel pipe, the plating layer is less liable to peel off even if the steel pipe is worked.

MODE FOR CARRYING OUT THE INVENTION

Hot-Dip Galvanized Steel Pipe

The present inventors studied the workability of a hot-dip galvanized steel pipe, and obtained the findings described below. The plating layer includes a Zn—Fe alloy layer formed at the interface with a base metal, and a Zn layer (η layer) formed on the surface. Of these layers, the Zn—Fe alloy layer has a low ductility. In the Zn—Fe alloy layer, therefore, cracking is liable to occur on account of bending work such as flaring. If a crack generated in the Zn—Fe alloy layer propagates to the Zn layer on the surface, the plating layer peels off.

If a dissimilar metal has mixedly entered into the Zn layer, the crack is further liable to propagate. Therefore, if a dissimilar metal has mixedly entered into the Zn layer, the plating layer is liable to peel off. In other words, by enhancing the purity of Zn layer, the plating layer can be restrained from peeling off, and the workability of the hot-dip galvanized steel pipe can be improved.

Figure 1A:
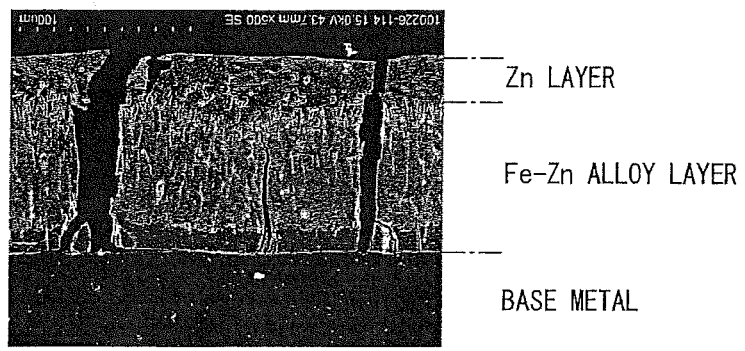
FIG. 1A is a scanning electron micrograph enlargedly showing a plating layer including a Zn layer having a low purity.
Figure 1B:
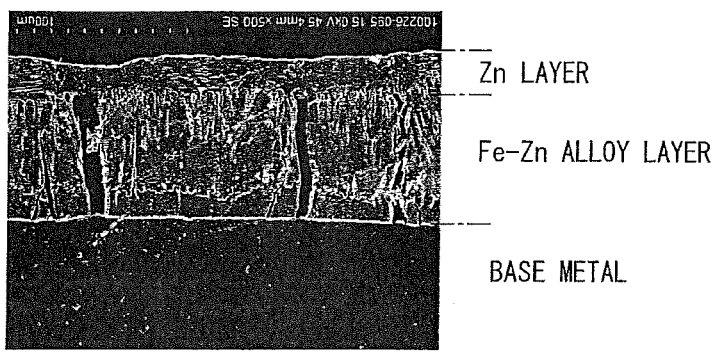
FIG. 1B is a scanning electron micrograph enlargedly showing a plating layer including a Zn layer having a high purity.

FIG. 1A is a scanning electron micrograph of the plating layer including the Zn layer having a low purity. FIG. 1B is a scanning electron micrograph of the plating layer including the Zn layer having a high purity. As shown in FIG. 1A, in the plating layer including the Zn layer having a low purity, a crack generated in the Fe—Zn alloy layer propagates to the Zn layer on the surface. On the other hand, as shown in FIG. 1B, in the plating layer including the Zn layer having a high purity, a crack generated in the Fe—Zn alloy layer stops at the Zn layer on the surface.

The present inventors found that if the fn defined by Formula (1) is at least 99.9 throughout the entire depth of plating layer, the plating layer of the hot-dip galvanized steel pipe is less liable to peel off:

$$fn = Fe + Al + Zn \quad (1)$$

where, the symbol of an element in Formula (1) represents the content (mass %) of that element in the plating layer.

The fn is measured by the following method. In an arbitrary region (discharge area: 4-mm dia, hereinafter referred to as a specific region) of the plating layer of the hot-dip galvanized steel pipe, the element analysis in the depth direction is made by using a Markus type high frequency glow discharge optical emission spectroscopic apparatus (manufactured by Horiba, Ltd., GD-Profiler2). The measurement conditions at this time are as given in Table 1. Thereby, the element distribution in the entire depth of the specific region can be obtained. Based on the obtained element distribution, the value fn at each depth (fn distribution) is determined.

TABLE 1

| Discharge area | 4-mm diameter |
| RF output | 35 W |
| Argon pressure | 600 Pa |
| Measurement depth | To 200 μm |

TABLE 1-continued

| Measurement intervals | Early stage 60 sec | 0.02 sec intervals |
| | Subsequently | 0.50 sec intervals |

In the present invention, in the obtained fn distribution, each of the values fn is at least 99.9.

The fn involves iron (Fe). Fe is alloyed with zinc to form the Zn—Fe alloy layer. Therefore, a large amount of Fe is contained in the plating layer. However, the Zn—Fe alloy layer is present separately from the Zn layer. Therefore, Fe does not mixedly enter into the Zn layer. For this reason, even if the plating layer contains iron, the workability of the hot-dip galvanized steel pipe does not decrease.

The fn involves aluminum (Al). Al improves the flowability of hot-dip galvanizing bath. If Al is contained in the hot-dip galvanizing bath, Al is also contained in the plating layer of the hot-dip galvanized steel pipe. However, Al is present concentratedly at a depth of about one micron from the plating surface. Therefore, even if the plating layer contains Al, the workability of hot-dip galvanized steel pipe does not decrease.

As described above, if the fn is at least 99.9 throughout the entire depth of plating layer, the plating layer is less liable to peel off even if working such as flaring is performed.

The hot-dip galvanized steel pipe can be manufactured by dipping a material pipe in a hot-dip galvanizing bath that contains 0.002 to 0.01 mass % of Al, the balance being Zn and impurities, wherein the total content of Pb, Sn, Cd, Sb, Bi, Cu, Ni, and In of the impurities is at most 0.1 mass %.

Hereunder, a method of manufacturing a hot-dip galvanized steel pipe in accordance with one embodiment of the present invention is described in detail.

Figure 2:
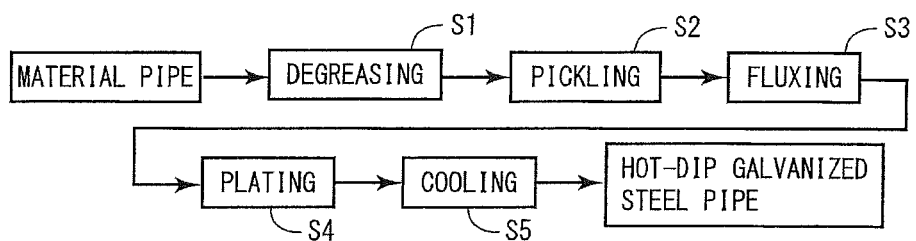
FIG. 2 is a flow diagram of a method of manufacturing a hot-dip galvanized steel pipe in accordance with one embodiment of the present invention.

FIG. 2 is a flow diagram of the method of manufacturing a hot-dip galvanized steel pipe in accordance with one embodiment of the present invention. The method of manufacturing a hot-dip galvanized steel pipe includes a step of degreasing a material pipe (step S1), a step of pickling the degreased material pipe (step S2), a step of flux-treating the pickled material pipe (step S3), a step of plating the flux-treated material pipe (step S4), and a step of cooling the plated steel pipe (step S5).

First, a material pipe to be plated is prepared. As the material pipe, any steel pipe can be used. The material pipe is, for example, an SGP steel pipe specified in JIS G3452 or an STPG steel pipe specified in JIS G3454. As the SGP steel pipe and the STPG steel pipe, any of an electric-resistance welded pipe, a butt welded pipe, and a seamless pipe may be used.

Next, the material pipe is dipped in a degreasing solution and is degreased (step S1). The degreasing is, for example, alkali degreasing or solvent degreasing. Thereby, oils sticking to the surface of material pipe are removed. Thereafter, the material pipe is washed by water to remove the sticking degreasing solution.

Next, the degreased material pipe is dipped in a pickling solution and is pickled (step S2). The pickling solution is sulfuric acid of 5 to 20 mass %. It is preferable that the sulfuric acid be heated for use to a temperature of at least 65° C.

To reduce the overpickling of material pipe and the grain boundary corrosion, a proper amount of acid corrosion inhibitor (inhibitor) may be contained in the pickling solution. The pickling time is, for example, 10 to 60 minutes. Thereby, scale on the surface of material pipe is removed.

Thereafter, the material pipe is washed by water to remove the sticking pickling solution.

Next, the pickled material pipe is flux-treated by a flux solution (step S3). In the flux treatment, the material pipe is dipped in the flux solution. As the flux solution, an aqueous solution of zinc chloride and ammonium chloride is used. The quantity ratio (mole ratio) of zinc chloride and ammonium chloride is preferably 1:1 to 1:5, further preferably 1:2 to 1:4.

The flux solution is heated for use to a temperature of 70 to 90° C. As the flux solution, a flux solution having a high concentration of at least 500 g/L is preferably used. The concentration of flux solution is further preferably at least 600 g/L, and is in the range to saturation. The flux concentration (g/L) is represented by the ratio of the total mass (g) of the contained zinc chloride and ammonium chloride to one liter (L) of water.

By the flux treatment, a flux film is formed on the material pipe. The flux film protects the surface of material pipe, and prevents zinc oxide from being involved at the time of plating and prevents poor plating from occurring.

Thereafter, the material pipe is dried. If moisture remains on the material pipe, the moisture vaporizes when it comes into contact with the hot-dip galvanizing bath, and scatters molten zinc, causing the occurrence of poor plating. To improve the draining of flux solution, a surface active agent is preferably contained in the flux solution. Also, by containing the surface active agent, the flux film is easily formed in a uniform manner. The surface active agent is, for example, lauryl trimethyl ammonium chloride, cetyl trimethyl ammonium chloride, or stearyl trimethyl ammonium chloride.

If the content of surface active agent is too low, the above-described effects cannot be achieved. Therefore, the lower limit of the concentration of surface active agent in the flux solution is 0.05 mass %. The concentration of surface active agent is preferably higher than 0.05 mass %. The lower limit of the concentration of surface active agent is further preferably 0.10 mass %. On the other hand, if the content of surface active agent is too high, the effects are saturated, and the surface active agent acts as an impurity, whereby poor plating is rather increased. Therefore, the concentration of surface active agent is preferably lower than 0.3 mass %, further preferably lower than 0.2 mass %.

Next, the flux-treated material pipe is dipped in a hot-dip galvanizing bath and is plated (step S4). The hot-dip galvanizing bath used in this embodiment contains 0.002 to 0.01 mass % of Al, the balance being Zn and impurities, wherein the total content of Pb, Sn, Cd, Sb, Bi, Cu, Ni, and In of the impurities is at most 0.1 mass %.

Aluminum (Al) improves the flowability of hot-dip galvanizing bath. If the content of Al in the hot-dip galvanizing bath is too low, the gloss of plating surface decreases. Therefore, the lower limit of Al content is 0.002 mass %. The Al content is preferably more than 0.002 mass %. The lower limit of Al content is further preferably 0.005 mass %. On the other hand, if the content of Al in the hot-dip galvanizing bath is too high, the effect of flux treatment is diminished, and poor plating occurs. Therefore, the upper limit of Al content is preferably 0.01 mass %.

Of the impurities in the hot-dip galvanizing bath, lead (Pb), tin (Sn), cadmium (Cd), antimony (Sb), bismuth (Bi), copper (Cu), nickel (Ni), and indium (In) mixedly enter into the Zn layer of plating layer of the hot-dip galvanized steel pipe, causing the plating layer to peel off easily. Therefore, the total content of these elements is preferably at most 0.1 mass %.

The temperature of the hot-dip galvanizing bath is, for example, 450 to 480° C. The time period for dipping the material pipe in the hot-dip galvanizing bath is, for example, 30 to 300 seconds. The temperature of the hot-dip galvanizing bath and the time period for dipping the material pipe in the hot-dip galvanizing bath are controlled according to the thickness of plating layer.

After having been dipped for a predetermined time period, the material pipe is pulled up from the hot-dip galvanizing bath. The material pipe is held above the hot-dip galvanizing bath for a certain time period so that surplus molten zinc sticking to the material pipe runs down. At this time, the surplus molten zinc may be removed by blowing compressed air or steam.

Finally, the plated steel pipe is cooled (step S5). The cooling may be air cooling, water cooling, or oil cooling. In the case of water cooling, warm water having a temperature of 40 to 80° C. is used.

Through the above-described steps, the hot-dip galvanized steel pipe is manufactured.

For the hot-dip galvanized steel pipe manufactured by using the hot-dip galvanizing bath, the fn defined by Formula (1) is at least 99.9 throughout the entire depth of plating layer. Therefore, even if the hot-dip galvanized steel pipe is subjected to flaring, the plating layer is less liable to peel off.

The method of manufacturing the hot-dip galvanized steel pipe in accordance with this embodiment is preferably such that (A) in the pickling step (step S2), the material pipe is pickled by sulfuric acid having a temperature of at least 65° C., and (B) in the flux-treating step (step S3), the flux treatment is performed by using a flux solution containing at least 600 g/L in total of at least one of zinc chloride and ammonium chloride and 0.05 to 0.3 mass % of the surface active agent.

In the hot-dip galvanizing bath in accordance with this embodiment, the total content of Pb, Sn, Cd, Sb, Bi, Cu, Ni, and In is at most 0.1 mass %. These elements improve the flowability of the hot-dip galvanizing bath. Therefore, if plating is performed by using the hot-dip galvanizing bath in accordance with this embodiment, poor plating is liable to occur.

Accordingly, by performing the preparations meeting the conditions of (A) and (B), the reactivity of the surface of material pipe is improved. Thereby, even if plating is performed by using the hot-dip galvanizing bath containing small amounts of impurities as in this embodiment, the occurrence of poor plating can be reduced.

This effect is thought to be based on the following action. First, by the pickling using high-temperature sulfuric acid, the formation of smut on the surface of material pipe is reduced, and a proper surface roughness is obtained. Incidentally, the smut is a ferric salt insoluble in acid, and sticks in black to the pipe surface after pickling. Thereby, a large amount of flux can be dispersed uniformly on the surface of material pipe. By dispersing a large amount of flux uniformly, even if plating is performed by using the hot-dip galvanizing bath containing small amounts of impurities, the occurrence of poor plating can be reduced. Concerning hydrochloric acid, although it has an effect of reducing the smut, it is poor in reactivity as compared with high-temperature sulfuric acid. Consequently, it is thought that some metal oxides remain on the surface in a state before pickling without reacting, and may cause poor plating.

EXAMPLE 1

Figure 3A:
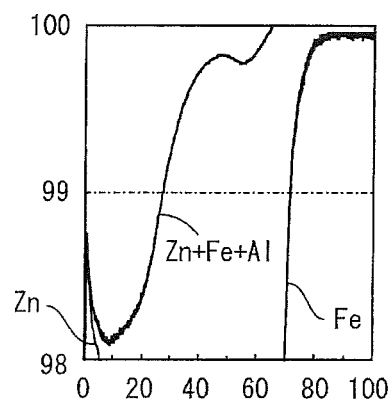
FIG. 3A is a graph showing an element distribution in a plating layer of a hot-dip galvanized steel pipe manufactured by using a hot-dip galvanizing bath of a certain condition.
Figure 3B:
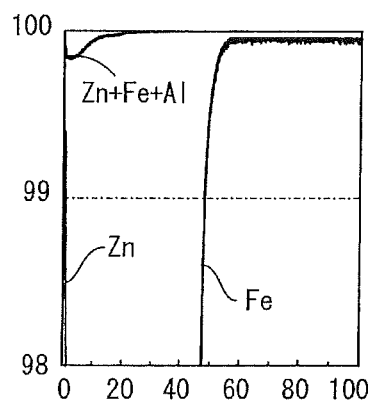
FIG. 3B is a graph showing an element distribution in a plating layer of a hot-dip galvanized steel pipe manufactured by using a hot-dip galvanizing bath of another condition.
Figure 3C:
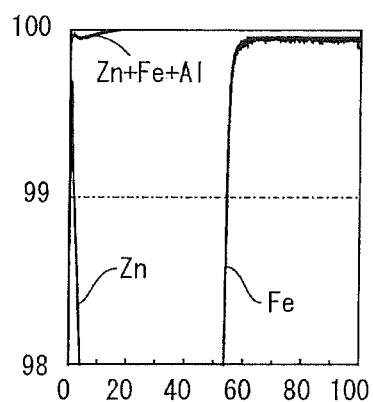
FIG. 3C is a graph showing an element distribution in a plating layer of a hot-dip galvanized steel pipe manufactured by using a hot-dip galvanizing bath of still another condition.
Figure 3D:
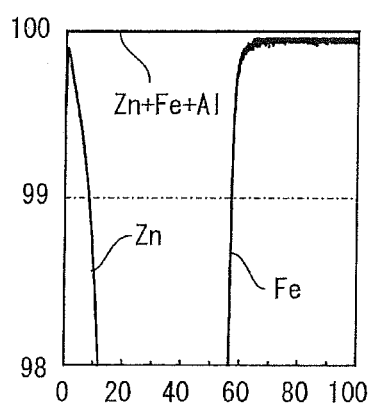
FIG. 3D is a graph showing an element distribution in a plating layer of a hot-dip galvanized steel pipe manufactured by using a hot-dip galvanizing bath of yet another condition.
Figure 4A:
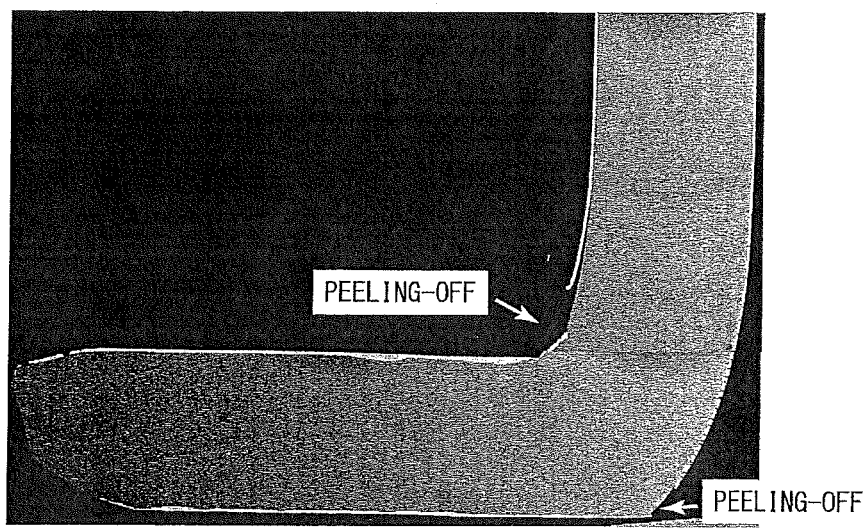
FIG. 4A is an optical micrograph of a longitudinal cross section of a flared part of a hot-dip galvanized steel pipe manufactured by using a hot-dip galvanizing bath of a certain condition.
Figure 4B:
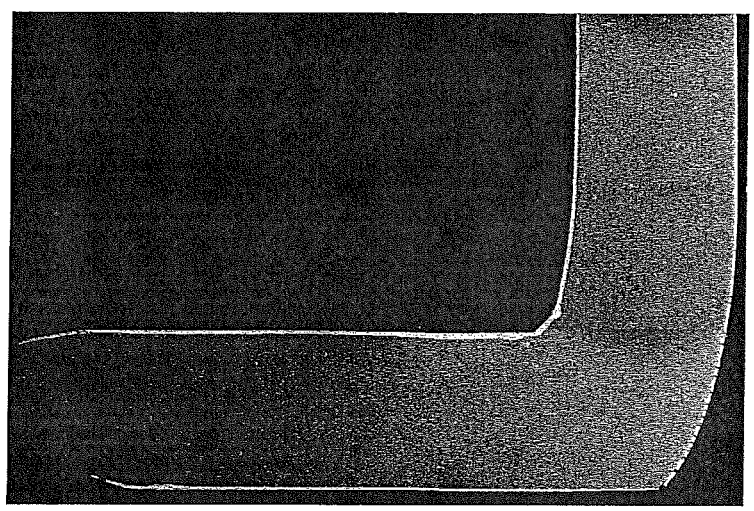
FIG. 4B is an optical micrograph of a longitudinal cross section of a flared part of a hot-dip galvanized steel pipe manufactured by using a hot-dip galvanizing bath of another condition.

In the following, the present invention is explained more specifically with reference to Examples. These examples by no means restrict the present invention.
[Composition Analysis Test of Plating Layer]
Hot-dip galvanized steel pipes were produced by using a plurality of hot-dip galvanizing baths. Then, the composition analysis of the plating layer of each of the hot-dip galvanized steel pipes was made.
As a material pipe, an SGP steel pipe (C: 0.05 mass %, Si: 0.19 mass %, Mn: 0.34 mass %, electric-resistance welded pipe, outside diameter: 139.8 mm) was used. As shown in FIG. 2, the degreasing, pickling, and flux treatment of material pipe were performed. As the conditions of pickling treatment, pickling condition 2 of the later-described Example 2 was employed, and as the conditions of flux treatment, fluxing condition 2 of the later-described Example 2 was employed. The flux-treated material pipes were dipped in four kinds of hot-dip galvanizing baths and was plated. Table 2 gives the contents (unit: mass %) of Fe, Al, Pb, Sn, Cd, Sb, Bi, Cu, Ni, and In of each of the hot-dip galvanizing baths (conditions 1 to 4). The balance of composition was Zn and impurities. In the "amounts of impurities" column in Table 2, the total value of the contents of Pb, Sn, Cd, Sb, Bi, Cu, Ni, and In was described.

baths, FIG. 3A being a graph resulting from condition 1, FIG. 3B being a graph from condition 2, FIG. 3C being a graph from condition 3, and FIG. 4D being a graph from condition 4. The abscissas in each graph of FIGS. 3A to 3D represents the distance (μm) in the depth direction from the surface of plating layer. The ordinates in each graph of FIGS. 3A to 3D represents the content (wt %) of Zn, the content (wt %) of Fe, and the total value of the contents of Zn, Fe, and Al (Zn+Fe+Al=fn, wt %) of the composition of plating layer in each depth represented by the abscissas.
As shown in FIGS. 3A to 3D, when the amounts of impurities in the hot-dip galvanizing bath decreased, the fn increased throughout the entire depth of plating layer of the hot-dip galvanized steel pipe. As shown in FIGS. 3C and 3D, in condition 3 and condition 4, the fn was at least 99.9 at every depth of plating layer of the hot-dip galvanized steel pipe. On the other hand, as shown in FIGS. 3A and 3B, in condition 1 and condition 2, the fn was less than 99.9 at some depths of plating layer of the hot-dip galvanized steel pipe.
[Flaring Test]
The hot-dip galvanized steel pipes manufactured by using the hot-dip galvanizing baths of conditions 1 to 4 were subjected to flaring. Further, each of the flared hot-dip galvanized steel pipes was sliced in parallel with the axial direction, and the longitudinal cross section of the flared part was observed.
For the hot-dip galvanized steel pipes manufactured by using the hot-dip galvanizing baths of conditions 1 and 2, the floating and peeling-off of plating layer occurred in large numbers on account of flaring. On the other hand, for the hot-dip galvanized steel pipes manufactured by using the hot-dip galvanizing baths of conditions 3 and 4, even if flaring was performed, the peeling-off of plating layer did not occur.
FIG. 4A is an optical micrograph of a longitudinal cross section of the flared part of the hot-dip galvanized steel pipe manufactured by using the hot-dip galvanizing bath of condition 1. FIG. 4B is an optical micrograph of a longitu-

TABLE 2

| | Composition of hot-dip galvanizing bath (unit: mass %, balance being zinc and impurities) | | | | | | | | | | Amounts of |
| --- | --- | --- | --- | --- | --- | --- | --- | --- | --- | --- | --- |
| | Fe | Al | Pb | Sn | Cd | Sb | Bi | Cu | Ni | In | impurities |
| Condition 1 | 0.06 | 0.003 | 1.17 | <0.001 | <0.001 | <0.001 | <0.001 | <0.001 | <0.001 | <0.001 | 1.17 |
| Condition 2 | 0.022 | 0.0041 | 0.12 | <0.001 | <0.001 | <0.001 | <0.001 | <0.001 | <0.001 | <0.001 | 0.12 |
| Condition 3 | 0.02 | 0.0045 | 0.022 | <0.001 | <0.001 | <0.001 | <0.001 | <0.001 | <0.001 | <0.001 | 0.02 |
| Condition 4 | 0.05 | 0.005 | <0.001 | <0.001 | <0.001 | <0.001 | <0.001 | <0.001 | <0.001 | <0.001 | <0.008 |

The temperature of the hot-dip galvanizing bath was 465° C. Each of the material pipes was dipped in the hot-dip galvanizing bath for 60 seconds. The coating weight of a hot-dip galvanized steel pipe was about 500 g/m².
For the hot-dip galvanized steel pipe manufactured by using each of the hot-dip galvanizing baths, the composition analysis of plating layer was made. As described before, the composition analysis of plating layer was made under the conditions given in Table 1 by using the Markus type high frequency glow discharge optical emission spectroscopic apparatus (manufactured by Horiba, Ltd., GD-Profiler2).
The analysis results are shown in FIGS. 3A to 3D. FIGS. 3A to 3D are graphs showing element distributions in the depth directions of plating layers of the hot-dip galvanized steel pipes manufactured by using the hot-dip galvanizing dinal cross section of the flared part of the hot-dip galvanized steel pipe manufactured by using the hot-dip galvanizing bath of condition 4. FIG. 1A is a scanning electron micrograph enlargedly showing the plating layer of the hot-dip galvanized steel pipe manufactured by using the hot-dip galvanizing bath of condition 1. FIG. 1B is a scanning electron micrograph enlargedly showing the plating layer of the hot-dip galvanized steel pipe manufactured by using the hot-dip galvanizing bath of condition 4.
As shown in FIG. 4A, for the hot-dip galvanized steel pipe manufactured by using the hot-dip galvanizing bath of condition 1, the floating and peeling-off of plating layer occurred in large numbers on account of flaring. On the other hand, as shown in FIG. 4B, for the hot-dip galvanized steel pipe manufactured by using the hot-dip galvanizing bath of condition 4, even if flaring was performed, the peeling-off of plating layer did not occur.

As shown in FIG. 1A, in the plating layer of the hot-dip galvanized steel pipe manufactured by using the hot-dip galvanizing bath of condition 1, a crack generated in the Fe—Zn alloy layer propagated to the Zn layer on the surface. On the other hand, as shown in FIG. 1B, in the plating layer of the hot-dip galvanized steel pipe manufactured by using the hot-dip galvanizing bath of condition 4, a crack generated in the Fe—Zn alloy layer stopped at the Zn layer on the surface.

EXAMPLE 2

Examination of Pickling Conditions and Fluxing Conditions

Plating was performed by changing the pickling conditions and fluxing conditions, and the presence and absence of poor plating were examined. The plating conditions were the same as the conditions under which the hot-dip galvanized steel pipe was manufactured in the composition analysis test of plating layer. As the hot-dip galvanizing bath, the hot-dip galvanizing bath of condition 4 in Table 2 was used.

As a material pipe, an SGP steel pipe (C: 0.05 mass %, Si: 0.19 mass %, Mn: 0.34 mass %, electric-resistance welded pipe, outside diameter: 139.8 mm) was used. The degreasing, pickling, and flux treatment of material pipe were performed. First, examination was conducted by fixing the fluxing conditions and by changing the pickling conditions.

Table 3 gives the pickling conditions (pickling conditions 1 to 4), and the foaming during pickling, appearance after pickling, appearance after flux treatment (after flux drying), and appearance after plating under each of the pickling conditions. The fluxing conditions were as described below. As a flux solution, an aqueous solution containing 625 g/L of a 1:3 mixture of zinc chloride and ammonium chloride and 0.2 mass % of a surface active agent was used. The pickled material pipe was dipped in the flux solution heated to a temperature of 75° C. The material pipe having been dipped in the flux solution was dried in a 180° C. atmosphere for five minutes. For the material pipe on which smut had been produced by pickling, the flux treatment was performed after the smut had been removed. After plating, the plated material pipe was air-cooled, whereby a hot-dip galvanized steel pipe was manufactured.

TABLE 3

|  | Pickling condition 1 | Pickling condition 2 | Pickling condition 3 | Pickling condition 4 |
| --- | --- | --- | --- | --- |
| Acid type | Sulfuric acid | Sulfuric acid | Hydrochloric acid | Hydrochloric acid |
| Acid concentration (mass %) | 12.5 | 17.5 | 10.0 | 10.0 |
| Inhibitor name | IBIT-600L-7 | IBIT-600L-7 | IBIT-700BK | IBIT-700BK |
| Inhibitor concentration (mass %) | 0.05 | 0.05 | 0.1 | 0.1 |
| Pickling temperature (° C.) | 60 | 80 | 20 | 40 |
| Pickling time (min) | 15 | 15 | 15 | 30 |
| Appearance after plating | Poor plating present | Poor plating absent | Poor plating in large numbers | Poor plating present |

As given in Table 3, on the material pipe pickled under pickling condition 1, poor plating occurred. The cause for this is thought to be that the pickling temperature was low.

On the material pipe pickled under pickling condition 2, poor plating did not occur.

On the material pipes pickled under pickling conditions 3 and 4, poor plating occurred. The cause for this is thought to be that the pickling was performed by using hydrochloric acid.

Next, examination was conducted by fixing the pickling conditions to pickling condition 2 of Table 3 and by changing the fluxing conditions.

Table 4 gives the fluxing conditions (fluxing conditions 1 to 4), and the presence and absence of undissolved chemical agent, appearance after flux drying, and appearance after plating under each of the fluxing conditions. As a flux solution, an aqueous solution containing a 1:3 mixture of zinc chloride and ammonium chloride was used. In the "Undissolved chemical agent" column in Table 4, the presence and absence of undissolved part of this mixture were described. The pickled material pipe was dipped in the flux solution heated to a temperature of 75° C. The material pipe having been dipped in the flux solution was dried in a 180° C. atmosphere for five minutes.

TABLE 4

|  | Fluxing condition 1 | Fluxing condition 2 | Fluxing condition 3 | Fluxing condition 4 |
| --- | --- | --- | --- | --- |
| Flux concentration (g/L) | 200 | 625 | 900 | 625 |
| Surface active agent concentration (mass %) | 0.2 | 0.2 | 0.2 | No surface active agent |
| Undissolved chemical agent | Absent | Absent | Present | Absent |
| Appearance after plating | Poor plating present | Poor plating absent | Poor plating absent | Poor plating in large numbers |

As given in Table 4, on the material pipe flux-treated under fluxing condition 1, poor plating occurred. The cause for this is thought to be that the flux concentration was low.

On the material pipes flux-treated under fluxing conditions 2 and 3, poor plating did not occur.

On the material pipe flux-treated under fluxing condition 4, poor plating occurred. The cause for this is thought to be that no surface active agent was contained.

INDUSTRIAL APPLICABILITY

The present invention can be used on an industrial basis as a hot-dip galvanized steel pipe in which the plating layer thereof is less liable to peel off, and as a method of manufacturing the hot-dip galvanized steel pipe.

The invention claimed is:

1. A method of manufacturing a hot-dip galvanized steel pipe, comprising a step of dipping a material pipe in a hot-dip galvanizing bath, wherein
   the hot-dip galvanizing bath contains 0.002 to 0.01 mass % of Al, the balance being Zn and impurities,
   a Sn content of the impurities is less than 0.001%,
   an In content of the impurities is less than 0.001%, and
   a total content of Pb, Sn, Cd, Sb, Bi, Cu, Ni, and In of the impurities is at most 0.1 mass %.

2. The method of manufacturing a hot-dip galvanized steel pipe according to claim 1, further comprising:
   a step of pickling the material pipe by applying sulfuric acid having a temperature of at least 65° C.; and
   a step of treating the pickled material pipe by applying a flux solution before the step of dipping the material pipe in the hot-dip galvanizing bath,
   wherein the flux solution containing at least 600 g/L in total of at least one of zinc chloride and ammonium chloride and 0.05 to 0.3 mass % of surface active agent.

* * * * *